United States Patent
Stevens et al.

(10) Patent No.: US 8,378,841 B2
(45) Date of Patent: Feb. 19, 2013

(54) TRACKING OF OIL DRILLING PIPES AND OTHER OBJECTS

(75) Inventors: John K. Stevens, Stratham, NH (US); M. Jason August, Toronto (CA); Paul Waterhouse, Seikirk (CA)

(73) Assignee: Visible Assets, Inc, Mississauga, Ontario (CA)

( * ) Notice: Subject to any disclaimer, the term of this patent is extended or adjusted under 35 U.S.C. 154(b) by 367 days.

(21) Appl. No.: 12/720,401

(22) Filed: Mar. 9, 2010

(65) Prior Publication Data

US 2010/0245075 A1 Sep. 30, 2010

Related U.S. Application Data

(63) Continuation of application No. 11/677,037, filed on Feb. 20, 2007, now Pat. No. 7,675,422, which is a continuation-in-part of application No. 11/461,443, filed on Jul. 31, 2006, now Pat. No. 7,277,014, which is a continuation-in-part of application No.

(Continued)

(51) Int. Cl.
*E21B 47/09* (2006.01)
*G01V 3/18* (2006.01)
(52) U.S. Cl. ............... 340/854.6; 340/572.1; 340/572.7; 340/572.8; 340/853.3; 340/854.1; 340/539.27; 166/250.01; 166/255.1; 175/40
(58) Field of Classification Search ............... 340/572.1, 340/572.7, 572.8, 10.1, 10.34, 853.1, 853.2, 340/854.6, 853.3; 166/250.01, 250.11, 250.12, 166/255.1; 175/40
See application file for complete search history.

(56) References Cited

U.S. PATENT DOCUMENTS

| | | | |
|---|---|---|---|
| 2,779,908 A | 1/1957 | Martin | |
| 3,268,900 A | 8/1966 | Waszkiewicz | |
| 3,406,391 A | 10/1968 | Von, Jr. | |
| 3,426,151 A | 2/1969 | Tygart et al. | |
| 3,427,614 A | 2/1969 | Vinding | |
| 3,500,373 A | 3/1970 | Minasy | |
| 3,528,014 A | 9/1970 | Albee | |
| 3,541,257 A | 11/1970 | McCormick et al. | |
| 3,601,550 A | 8/1971 | Spracklen | |

(Continued)

FOREIGN PATENT DOCUMENTS

| | | |
|---|---|---|
| EP | 0594375 | 4/1994 |
| KR | 2004008948 | 1/2004 |

(Continued)

OTHER PUBLICATIONS

Lindsay, Jeffrey. "Cascading RFID Tags", Dec. 23, 2003, pp. 1-10.

(Continued)

*Primary Examiner* — George Bugg
*Assistant Examiner* — Anne Lai
(74) *Attorney, Agent, or Firm* — Larson & Anderson, LLC

(57) ABSTRACT

Identification and tracking of hollow pipes at a site where the hollow pipes are to be stored or interconnected, such as an oil drilling site where the aforesaid hollow pipes are to be connected and the drillstring of pipes is to be inserted into a drilled hole on solid ground or under a deepsea drilling platform is achieved. Each hollow pipe is provided with a low frequency radio frequency identification (RFID) tag attached to the pipe's outer surface. The RFID tag is operable at a low radio frequency not exceeding 1.0 megahertz and may be disposed within a recess in the pipe's outer surface. A tracking system provides communication be the tags and a reader.

15 Claims, 3 Drawing Sheets

Related U.S. Application Data

11/276,216, filed on Feb. 17, 2006, now Pat. No. 7,164,359, which is a continuation of application No. 10/820,366, filed on Apr. 8, 2004, now Pat. No. 7,049,963, which is a continuation-in-part of application No. 11/639,857, filed on Dec. 15, 2006.

(60) Provisional application No. 60/461,562, filed on Apr. 9, 2003, provisional application No. 61/339,349, filed on Mar. 3, 2010.

(56) References Cited

U.S. PATENT DOCUMENTS

| | | | |
|---|---|---|---|
| 3,689,885 A * | 9/1972 | Kaplan et al. | 340/10.1 |
| 3,713,124 A | 1/1973 | Durland et al. | |
| 3,713,148 A | 1/1973 | Cardullo et al. | |
| 3,739,376 A | 6/1973 | Keledy | |
| 3,859,624 A | 1/1975 | Kriofsky et al. | |
| 4,019,181 A | 4/1977 | Olsson et al. | |
| 4,190,830 A | 2/1980 | Bell | |
| 4,361,153 A | 11/1982 | Slocum et al. | |
| 4,436,203 A | 3/1984 | Reyner | |
| 4,449,632 A | 5/1984 | Marusiak, Jr. | |
| 4,724,427 A | 2/1988 | Carroll | |
| 4,750,197 A | 6/1988 | Denekamp et al. | |
| 4,774,504 A | 9/1988 | Hartings | |
| 4,792,796 A | 12/1988 | Bradshaw et al. | |
| 4,807,140 A * | 2/1989 | Saulnier | 700/116 |
| 4,812,811 A | 3/1989 | Asbrink et al. | |
| 4,821,291 A | 4/1989 | Stevens et al. | |
| 4,857,893 A | 8/1989 | Carroll | |
| 4,879,756 A | 11/1989 | Stevens et al. | |
| 4,912,471 A * | 3/1990 | Tyburski et al. | 340/10.34 |
| 4,922,261 A | 5/1990 | O'Farrell | |
| 4,937,586 A | 6/1990 | Stevens et al. | |
| 4,961,028 A | 10/1990 | Tanaka | |
| 5,012,236 A | 4/1991 | Troyk et al. | |
| 5,103,234 A | 4/1992 | Watkins et al. | |
| 5,129,519 A | 7/1992 | David et al. | |
| 5,177,432 A | 1/1993 | Waterhouse et al. | |
| 5,202,680 A * | 4/1993 | Savage | 340/853.1 |
| 5,241,286 A | 8/1993 | Mirow | |
| 5,245,534 A | 9/1993 | Waterhouse et al. | |
| 5,260,694 A | 11/1993 | Remahl | |
| 5,317,309 A | 5/1994 | Vercellotti et al. | |
| 5,351,052 A | 9/1994 | D'Hont et al. | |
| 5,374,815 A | 12/1994 | Waterhouse et al. | |
| 5,485,166 A | 1/1996 | Verma et al. | |
| 5,517,188 A | 5/1996 | Carroll | |
| 5,519,381 A | 5/1996 | March et al. | |
| 5,532,465 A | 7/1996 | Waterhouse et al. | |
| 5,591,951 A | 1/1997 | Doty | |
| 5,682,143 A | 10/1997 | Brady et al. | |
| 5,686,902 A | 11/1997 | Reis et al. | |
| 5,774,053 A | 6/1998 | Porter | |
| 5,920,287 A | 7/1999 | Belcher et al. | |
| 5,920,576 A | 7/1999 | Eaton et al. | |
| 5,929,779 A | 7/1999 | MacLellan et al. | |
| 5,969,595 A | 10/1999 | Schipper et al. | |
| 5,995,019 A | 11/1999 | Chieu et al. | |
| 6,025,780 A | 2/2000 | Bowers et al. | |
| 6,027,027 A | 2/2000 | Smithgail | |
| 6,091,319 A | 7/2000 | Black et al. | |
| 6,104,281 A | 8/2000 | Heinrich et al. | |
| 6,127,917 A | 10/2000 | Tuttle | |
| 6,127,928 A | 10/2000 | Issacman et al. | |
| 6,127,976 A | 10/2000 | Boyd et al. | |
| 6,164,551 A | 12/2000 | Altwasser | |
| 6,176,433 B1 | 1/2001 | Uesaka et al. | |
| 6,195,006 B1 | 2/2001 | Bowers et al. | |
| 6,208,235 B1 | 3/2001 | Trontelj | |
| 6,222,452 B1 | 4/2001 | Ahlstrom et al. | |
| 6,236,911 B1 | 5/2001 | Krueger | |
| 6,280,544 B1 | 8/2001 | Fox et al. | |
| 6,294,997 B1 | 9/2001 | Paratore et al. | |
| 6,297,734 B1 | 10/2001 | Richardson et al. | |
| 6,318,636 B1 | 11/2001 | Reynolds et al. | |
| 6,323,782 B1 | 11/2001 | Stephens et al. | |
| 6,329,944 B1 | 12/2001 | Richardson et al. | |
| 6,335,688 B1 | 1/2002 | Sweatte | |
| 6,354,493 B1 | 3/2002 | Mon | |
| 6,377,203 B1 | 4/2002 | Doany | |
| 6,452,340 B1 | 9/2002 | Morrissey et al. | |
| 6,496,806 B1 | 12/2002 | Horwitz et al. | |
| 6,512,457 B2 | 1/2003 | Irizarry et al. | |
| 6,512,478 B1 | 1/2003 | Chien | |
| 6,543,280 B2 * | 4/2003 | Duhon | 73/152.01 |
| 6,543,491 B1 | 4/2003 | Chung | |
| 6,566,997 B1 | 5/2003 | Bradin | |
| 6,584,301 B1 * | 6/2003 | Bohn et al. | 455/41.1 |
| 6,593,845 B1 | 7/2003 | Friedman et al. | |
| 6,624,752 B2 | 9/2003 | Klitsgaard et al. | |
| 6,662,078 B1 | 12/2003 | Hardgrave et al. | |
| 6,696,954 B2 | 2/2004 | Chung | |
| 6,700,491 B2 | 3/2004 | Shafer | |
| 6,705,522 B2 | 3/2004 | Gershman et al. | |
| 6,720,883 B2 | 4/2004 | Kuhr et al. | |
| 6,724,308 B2 | 4/2004 | Nicholson | |
| 6,738,628 B1 | 5/2004 | McCall et al. | |
| 6,745,027 B2 | 6/2004 | Twitchell, Jr. | |
| 6,766,854 B2 * | 7/2004 | Ciglenec et al. | 166/250.11 |
| 6,900,731 B2 | 5/2005 | Kreiner et al. | |
| 6,927,687 B2 | 8/2005 | Carrender | |
| 6,970,100 B2 * | 11/2005 | Lovegreen et al. | 340/870.17 |
| 6,989,764 B2 * | 1/2006 | Thomeer et al. | 340/853.2 |
| 6,995,729 B2 * | 2/2006 | Govari et al. | 343/867 |
| 7,000,692 B2 * | 2/2006 | Hosie et al. | 166/66 |
| 7,028,861 B2 | 4/2006 | Sayers et al. | |
| 7,044,373 B1 | 5/2006 | Garber et al. | |
| 7,049,963 B2 | 5/2006 | Waterhouse et al. | |
| 7,089,099 B2 | 8/2006 | Shostak et al. | |
| 7,098,794 B2 | 8/2006 | Lindsay et al. | |
| 7,098,856 B2 | 8/2006 | Okado | |
| 7,103,460 B1 | 9/2006 | Breed | |
| 7,159,654 B2 * | 1/2007 | Ellison et al. | 166/250.01 |
| 7,161,476 B2 | 1/2007 | Hardman et al. | |
| 7,191,932 B2 | 3/2007 | Fobbe et al. | |
| 7,193,515 B1 | 3/2007 | Roberts et al. | |
| 7,242,301 B2 | 7/2007 | August et al. | |
| 7,256,695 B2 | 8/2007 | Hamel et al. | |
| 7,327,250 B2 | 2/2008 | Harvey | |
| 7,647,987 B2 * | 1/2010 | Cole | 175/45 |
| 2001/0048361 A1 | 12/2001 | Mays et al. | |
| 2002/0014966 A1 * | 2/2002 | Strassner et al. | 340/572.1 |
| 2002/0041235 A1 | 4/2002 | Van Horn et al. | |
| 2002/0111819 A1 | 8/2002 | Li et al. | |
| 2002/0133942 A1 * | 9/2002 | Kenison et al. | 29/841 |
| 2003/0055689 A1 | 3/2003 | Block et al. | |
| 2003/0106455 A1 | 6/2003 | Weston | |
| 2003/0231020 A1 | 12/2003 | Yonezawa et al. | |
| 2004/0053641 A1 | 3/2004 | Leung et al. | |
| 2004/0066366 A1 | 4/2004 | Jung et al. | |
| 2004/0069849 A1 | 4/2004 | Stevens et al. | |
| 2004/0134620 A1 | 7/2004 | Soeborg | |
| 2004/0149822 A1 | 8/2004 | Stevens et al. | |
| 2004/0176032 A1 | 9/2004 | Kolola et al. | |
| 2004/0205350 A1 | 10/2004 | Waterhouse et al. | |
| 2004/0217865 A1 | 11/2004 | Turner | |
| 2004/0233054 A1 | 11/2004 | Neff et al. | |
| 2005/0029345 A1 | 2/2005 | Waterhouse et al. | |
| 2005/0043850 A1 | 2/2005 | Stevens et al. | |
| 2005/0043886 A1 | 2/2005 | Stevens et al. | |
| 2005/0083213 A1 | 4/2005 | Stevens et al. | |
| 2005/0086983 A1 | 4/2005 | Stevens et al. | |
| 2005/0149226 A1 | 7/2005 | Stevens et al. | |
| 2005/0189408 A1 | 9/2005 | Corbett, Jr. | |
| 2005/0205817 A1 | 9/2005 | Marcichow et al. | |
| 2005/0251330 A1 | 11/2005 | Waterhouse et al. | |
| 2006/0086498 A1 * | 4/2006 | Wetzel et al. | 166/250.12 |
| 2006/0124662 A1 | 6/2006 | Reynolds et al. | |
| 2006/0128023 A1 | 6/2006 | Waterhouse et al. | |
| 2006/0164232 A1 | 7/2006 | Waterhouse et al. | |
| 2006/0232417 A1 | 10/2006 | August et al. | |

| | | | |
|---|---|---|---|
| 2006/0281435 | A1* | 12/2006 | Shearer et al. ............. 455/343.1 |
| 2007/0023185 | A1* | 2/2007 | Hall et al. ................. 166/255.1 |
| 2009/0211754 | A1 | 8/2009 | Verret et al. |
| 2009/0266544 | A1 | 10/2009 | Redlinger et al. |

FOREIGN PATENT DOCUMENTS

| | | |
|---|---|---|
| WO | 9608760 | 3/1996 |
| WO | 9831608 A1 | 7/1998 |
| WO | 02071382 | 9/2002 |
| WO | 03094106 | 11/2003 |
| WO | 2006014666 | 2/2006 |
| WO | 2006035401 A2 | 4/2006 |

OTHER PUBLICATIONS

Cardullo, "RFID Pioneers Discuss its Origins," The Mercury News, Sun, Jul. 18, 2004.

Texas Insruments, Phillips Semiconductors, and Tagsys Inc., "Item-Level Visibility in the Pharmaceutical Supply Chain: A comparision of HF, UHF RFID Technologies," Jul. 2004.

Food and Drug Administration, "Radio Frequency Identification Feasibility Studies and Pilot Programs for Drugs," Guidance for FDA Staff and Industry, Compliance Policy Guides, Sec 400.210, Nov. 2004.

Scott Kirsner, "Radio Tags are Falling Off the Fast Track," The Boston Globe, May 31, 2004.

Barnaby Feder, "Despite Wal-Mart's Edict, Radio Tags Will Take Time," The New York Times, Dec. 27, 2004.

EPCglobal, Web Page Tag Specifications, Jan. 2005.

IEEE-USA, "The State of Radio Frequency Identification (RFID) Implementation and Its Policy Implications," Nov. 21, 2005.

* cited by examiner

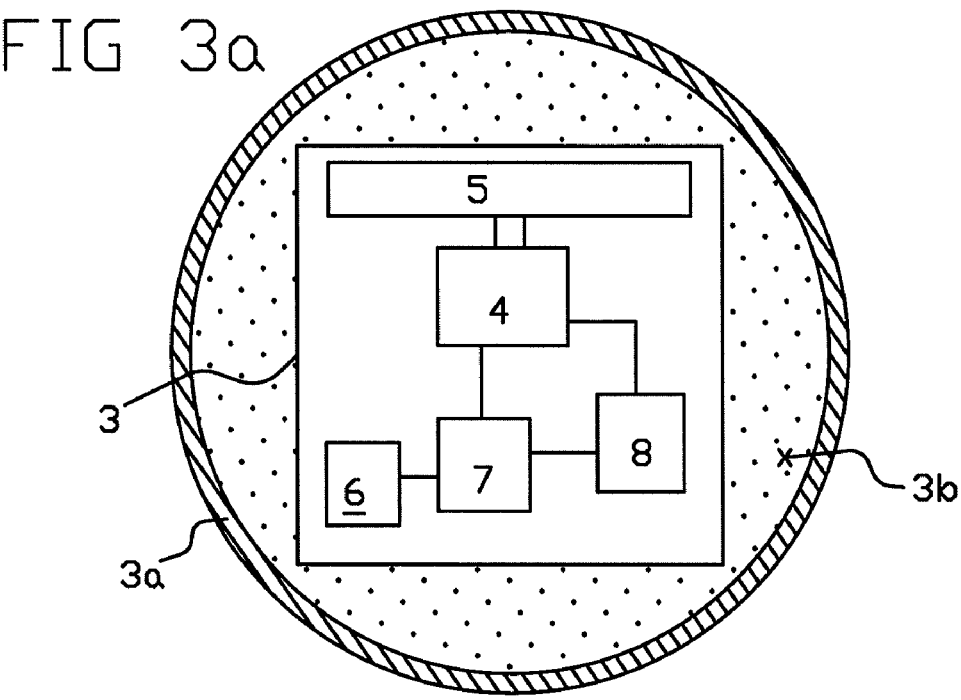
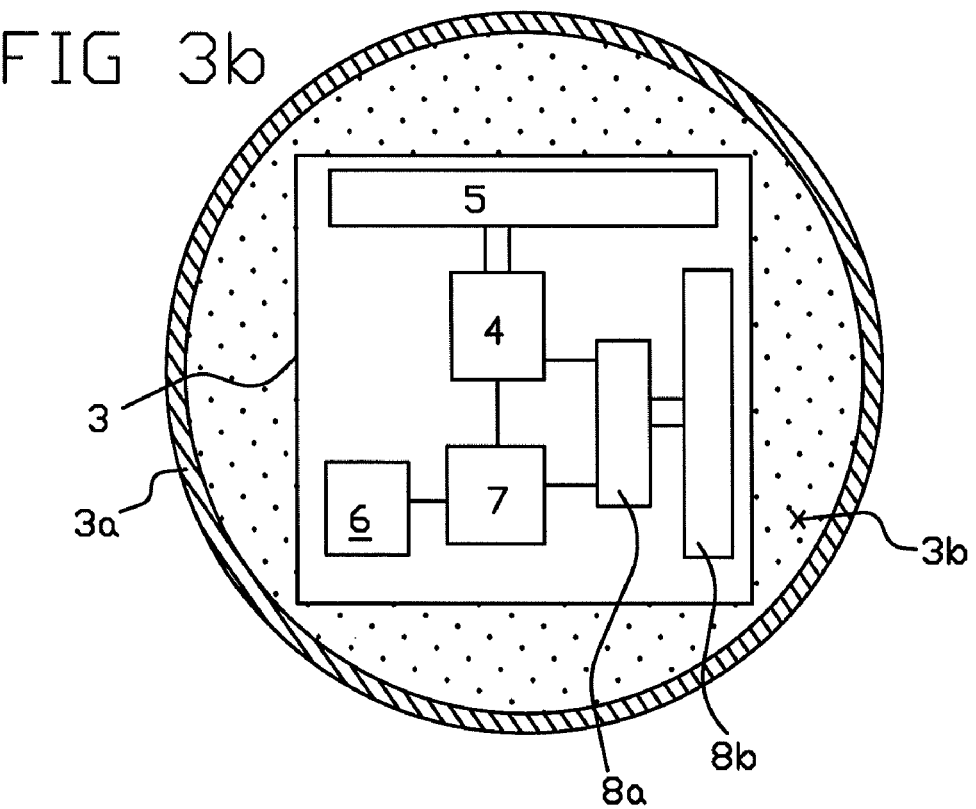

TRACKING OF OIL DRILLING PIPES AND OTHER OBJECTS

CROSS-REFERENCE TO RELATED APPLICATIONS

The present application claims the benefit of from U.S. Provisional Application No. 61/339,349, filed on Mar. 3, 2010, and is a continuation-in-part of U.S. application Ser. No. 11/677,037 filed Feb. 20, 2007, which is a continuation-in-part of U.S. application Ser. No. 11/461,443 filed Jul. 31, 2006, now U.S. Pat. No. 7,277,014, which is a continuation-in-part of U.S. application Ser. No. 11/276,216 filed Feb. 17, 2006, now U.S. Pat. No. 7,164,359, which is a continuation of U.S. application Ser. No. 10/820,366 filed Apr. 8, 2004, now U.S. Pat. No. 7,049,963, which claims the benefit of U.S. application No. 60/461,562 filed Apr. 9, 2003. This application is also a continuation in part of U.S. patent application Ser. No. 11/639,857, filed Dec. 15, 2006. All of these applications are incorporated herein by reference for all purposes.

FIELD OF THE INVENTION

This invention relates to a trackable pipe, such as a tubular pipe used in oil drilling, and to a system for detecting and tracking pipes such as hollow tubular pipes

BACKGROUND OF THE INVENTION

It is important to locate and track objects to maintain appropriate inventory levels and to prevent stoppages in operations that require a supply of such objects.

For example, in drilling for oil, the drilling site must be constantly supplied with an adequate supply of tubular pipes which are to be inserted into a drilled hole on solid ground or under seawater from a drilling platform. To prevent drilling operations from being interrupted, it is desirable to carry out regular audits of pipes in order to know when supplies are running low. Since the pipes are heavy and usually made of steel, it is difficult to move them around for visual inspection of identifying markings or to count them when they are tightly stacked together. Moreover, it is not feasible to use normal RF ID tags for tracking because they do not communicate well in an environment of steel, mud, or water.

SUMMARY OF THE INVENTION

The present invention broadly provides a trackable pipe comprising:
a) a hollow pipe comprising a wall portion having an outer surface;
b) a low frequency radio frequency identification (RFID) tag attached to the aforesaid hollow pipe at the aforesaid outer surface, the aforesaid RFID tag being operable at a low radio frequency not exceeding 1.0 megahertz, the aforesaid RFID tag comprising:
   i) a tag transceiver operable to transmit and receive data signals at the aforesaid low radio frequency not exceeding 1.0 megahertz; ii) an antenna operatively connected to the tag transceiver; iii) a tag data storage device operable to store data comprising identification data for identifying the aforesaid object;
   iv) a tag data processor operable to process data received from the aforesaid tag transceiver and the aforesaid tag data storage device and to send data to cause the aforesaid tag transceiver to emit an identification signal based upon the aforesaid identification data stored in the aforesaid tag data storage device; and v) a tag energy source for activating the aforesaid tag transceiver and the aforesaid tag data processor.

According to a preferred embodiment, the aforesaid wall portion comprises a recess that opens into the aforesaid outer surface, with the aforesaid RFID tag being disposed within the aforesaid recess of each hollow pipe.

In a preferred embodiment the aforesaid recess being filled, or "potted", with a protective material that surrounds the RFID tag. For example, such protective material may comprise solidified epoxy. Alternatively, the RFID tag may be placed within a container that is placed within the aforesaid recess and the container is then completely filled with such a protective potting material. For additional environmental protection, a protective cover may also be disposed over the RFID tag which is disposed in the recess.

According to another embodiment, the aforesaid RFID tag comprises a sensor operable to measure an environmental condition selected from temperature and pressure, said RFID tag further comprising a clocking device operable to identify times of data transmissions and of measurements of the aforesaid environmental conditions.

According to a first embodiment, the aforesaid tag energy source comprises an energy storage device, such as a battery.

According to a second embodiment, the aforesaid energy source comprises an electrical energy storage device and an electrical generator operable to energize the aforesaid electrical storage device. Preferably, the aforesaid electrical energy storage device comprises a power battery or capacitor, and the aforesaid electrical generator comprising a power antenna operable to pick up energy induced by an applied external electric field.

The invention further provides a system for tracking hollow pipes at a site where the hollow pipes are to be stored or interconnected (such as an oil drilling site where the aforesaid hollow pipes are connected and inserted into a drilled hole), the aforesaid system comprising:
a) a plurality of hollow pipes, each hollow pipe comprising a wall portion comprising an outer surface;
b) a low frequency radio frequency identification (RFID) tag attached to the aforesaid hollow pipe at the aforesaid outer surface, the aforesaid RFID tag being operable at a low radio frequency not exceeding 1.0 megahertz, the aforesaid RFID tag being disposed within the aforesaid recess of each hollow pipe, the aforesaid RFID tag comprising:
   i) a tag transceiver operable to transmit and receive data signals at the aforesaid low radio frequency not exceeding 1.0 megahertz;
   ii) a tag antenna (preferably comprising a ferrite core) operatively connected to the tag transceiver;
   iii) a tag data storage device operable to store data comprising identification data for identifying the aforesaid object;
   iv) a tag data processor operable to process data received from the aforesaid tag transceiver and the aforesaid data storage device and to send data to cause said transceiver to emit an identification signal based upon the aforesaid identification data stored in the aforesaid data storage device; and v) a tag energy source for activating the tag transceiver and the tag data processor;
c) a reader for reading the aforesaid identification data, the aforesaid reader comprising:
   i) a reader antenna configured to permit effective communication with each aforesaid RFID tag at the aforesaid low radio frequency not exceeding 1.0 megahertz;
   ii) a reader transceiver in operative communication with the aforesaid reader antenna, the aforesaid reader transceiver being operable to transmit and receive data signals at the aforesaid low radio frequency not exceeding 1.0 megahertz;

iii) a reader data storage device operable to store data;

iv) a reader data processor in operative communication with the aforesaid reader transceiver and the aforesaid reader data storage device; and v) a reader energy source (e.g. a battery or A.C. power supply) for activating said reader transceiver and said reader data processor. Preferably, the aforesaid reader antenna is positioned and configured to encircle a lateral cross-section of the aforesaid pipe during movement thereof past the reader antenna.

According to a first embodiment, the tag energy source comprises an energy storage device, such as a battery.

According to a second embodiment, the tag antenna is a tag communication antenna which preferably comprises a first elongated ferrite core for enhanced data communications. In this embodiment, the aforesaid tag energy source comprises a) a tag power antenna (preferably comprising a second elongated ferrite core, oriented substantially orthogonally to the first elongated ferrite core) operable to pick up electric energy induced by an applied varying electric field, and b) an energy storage device (such as a capacitor or chargeable battery) connected to receive charging energy from the tag power antenna. Preferably, the tag communication antenna is tuned to maximize signal strength at a frequency f(com) that is distinct from the frequency f(power) to which the tag power antenna is tuned. Neither f(com) nor f(power) exceed 1.0 megahertz. According to this embodiment, the reader further comprises a reader power antenna operable to generate the aforesaid applied varying electric field at a frequency close to f(power).

According to a further preferred embodiment, the aforesaid wall portion comprising a recess that opens into the aforesaid outer surface, the aforesaid RFID tag being disposed within the aforesaid recess of each hollow pipe.

BRIEF DESCRIPTION OF THE DRAWINGS

For a better understanding of the invention various features of preferred embodiments of the novel object, tag, and system are illustrated in the drawings, as will be described hereinbelow:

FIG. 3a is a schematic plan view of a container enclosing an RFID tag in accordance with a first embodiment of the invention;

FIG. 3b is a schematic plan view of a container enclosing an RFID tag in accordance with a second embodiment of the invention;

DESCRIPTION OF PREFERRED EMBODIMENTS

Figure 1:
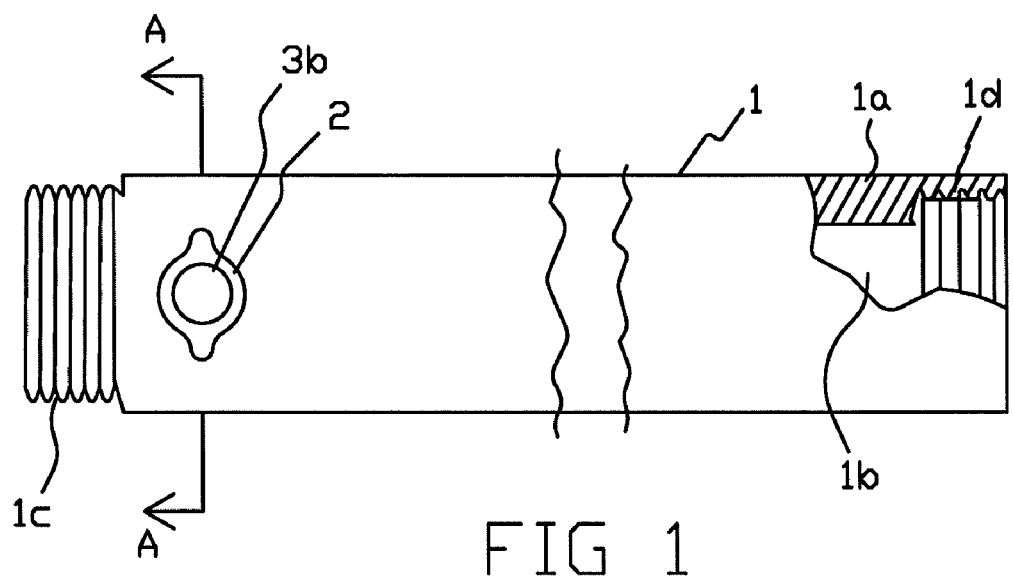
FIG. 1 is a schematic elevation view of one embodiment of a tubular hollow pipe equipped with a RFID tag in accordance with the invention.

As shown in FIG. 1, hollow pipe 1 comprises a wall portion 1a which surrounds a tubular space 1b. Pipe 1 is provided with a threaded male end 1c and a threaded female socket end 1d to permit adjacent pipes to be screwed together, as is needed when forming a continuous conduit for oil or gas extraction or for conveying water or sewage. Wall portion 1a has an outer surface 1e.

To permit identification and tracking of pipes, a low frequency radio frequency identification (RFID) tag 3 is attached to pipe 1 at its aforesaid outer surface 1e in a manner that protects the RFID tag from soil abrasion during handling and ensures that the tag is retained on pipe 1.

Figure 2:
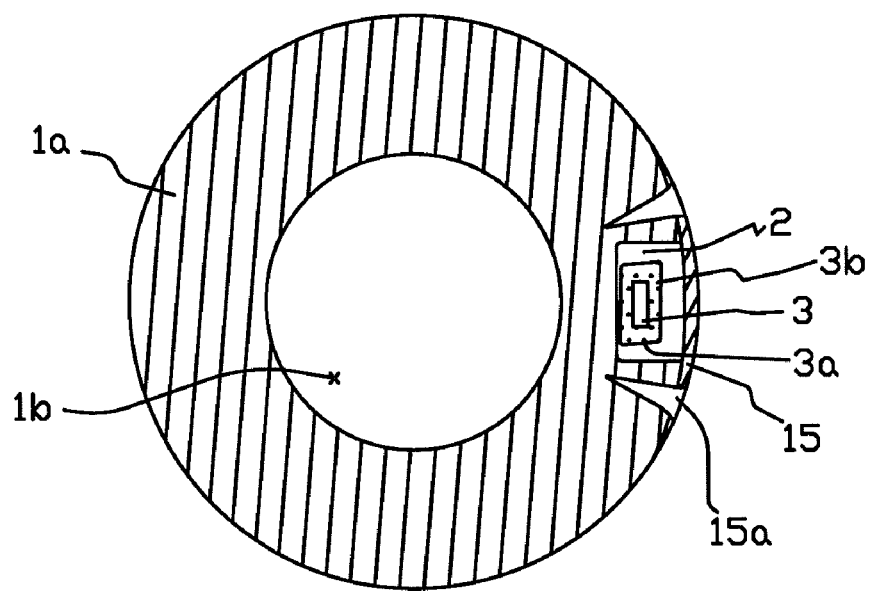
FIG. 2 is a schematic cross-sectional view taken along line A-A of FIG. 1.

According to the preferred embodiment of FIGS. 1 and 2, wall portion 1a has a recess 2 that opens into the outer surface 1e. RFID tag 3 is disposed within recess 2 by first disposing tag 3 within container 3a that is placed within the recess 2 and the container 3a is then completely filled with or "potted", with a protective material 3b that surrounds the RFID tag 3. For example, such protective material may comprise solidified epoxy. Moreover, the container 3a advantageously be composed of a material such as PEEK (polyether ether ketone), a high-temperature plastic material, to withstand extreme ambient conditions.

For additional environmental protection, a protective cover 15 may also be disposed over the RFID tag 3 and container 3a and then secured by screw fasteners 15a.

According to the present invention, it is important that low frequency RFID tag 3 is operable at a low radio frequency not exceeding 1.0 megahertz. As shown in FIG. 3, such a tag 3 is shown disposed within container 3a which is filled with epoxy or other suitable potting compound to protect tag 3 from high pressure changes and extreme impacts caused by handling and operation of drilling equipment.

As shown in FIG. 3, tag 3 comprises:

i) a tag transceiver 4 operable to transmit and receive data signals at the aforesaid low radio frequency not exceeding 1.0 megahertz;

ii) a tag antenna 5 operatively connected to the tag transceiver 4;

iii) a tag data storage device 6 that is operable to store data, including identification data for identifying the specific pipe 1 to which tag 3 is attached;

iv) a tag data processor 7 operable to process data received from tag transceiver 4 and tag data storage device 6 and to send data to cause the tag transceiver 4 to emit an identification signal based upon the aforesaid identification data stored in tag data storage device 6; and v) a tag energy source 8 for activating tag transceiver 4 and tag data processor 7.

Because it may be desirable to track the variation of environmental conditions, such as temperature, or to count the frequency of events, such as sudden impacts that pipe 1 may have endured, the RFID tag 3 may be equipped with one or more sensors and related clocking devices to meet these needs.

For superior communication of data signals to RFID tag 3 at low frequencies, it is desirable to use a tag antenna 5 which comprises a first elongated ferrite core with a number of windings thereon, as is well known to those skilled in the field of antenna design.

Moreover, tag energy source 8 may comprise an energy storage device, such as a battery. Alternatively, as shown in FIG. 3b, tag energy source 8 may comprise an electrical energy storage device 8a (e.g. a chargeable battery or capacitor) together with an electrical generator operable to energize the aforesaid electrical storage device. For example, the aforesaid electrical generator may comprise a tag power antenna 8b operable to pick up energy induced by an applied external varying electric field. Tag power antenna 8b preferably comprises a second elongated ferrite core, oriented substantially orthogonally to the first elongated ferrite core (of tag communication antenna 5) and energy storage 8a is connected to receive charging energy from tag power antenna 8b. Preferably, the tag communication antenna 5 is tuned to maximize signal strength at a frequency f(com) that is distinct from the frequency f(power) to which tag power antenna 8b is tuned. Neither f(com) nor f(power) should exceed 1.0 megahertz in order to enable clear data communication in an environment of metal and liquids. Where frequencies are set by using clock comprising a radio crystal it is advantageous that the frequencies be integer multiples of one another. For example, when f(power)=64 hertz, then f(com) could be 128 hertz.

While FIGS. 1-3 show that RFID tag 3 is attached to pipe 3 by placing it within recess 2, other methods of attachment may be used, provided that RFID tag is well protected from abrasion and damage due to contact with soil and rocks. For example RFID tag 3 may be embedded into a flat sleeve or ring that would be slipped onto a pipe, much as a diamond is embedded into an engagement ring which is then slipped onto a finger.9

Figure 5:
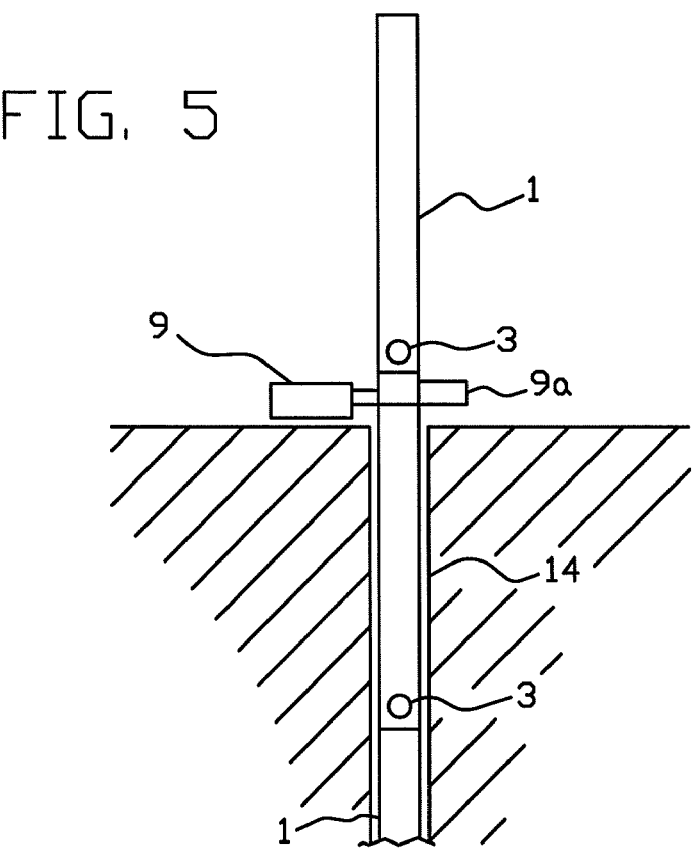
FIG. 5 is a schematic view of a system for tracking pipes at an oil or gas drilling site, in accordance with an embodiment of the invention.
Figure 4:
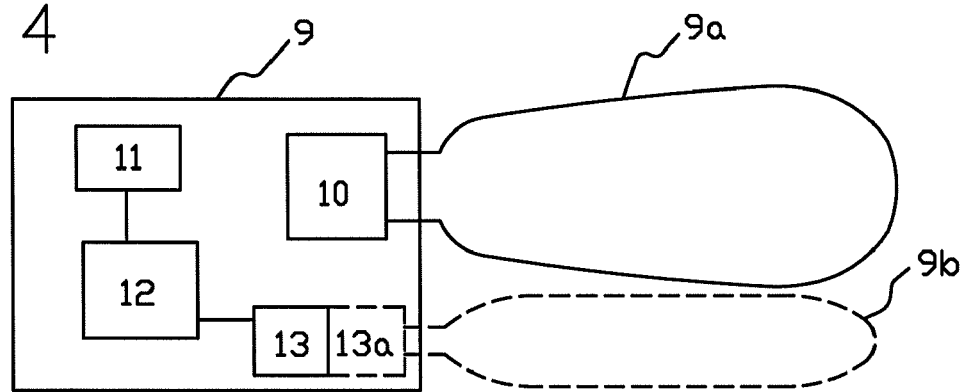
FIG. 4 is a schematic view of a reader for reading data from tags attached to pipes, in accordance with an embodiment of the invention.

FIG. 5 schematically depicts a system for tracking tagged hollow pipes 1 (as described hereinabove with respect to FIGS. 1, 2, and 3) at a site where a plurality of hollow pipes 1 are to be stored or interconnected (such as an oil drilling site where the aforesaid hollow pipes 1 are connected and inserted into a drilled hole 14).:

In addition to the tag-equipped pipes 1, the tracking system also includes a reader 9, as shown in FIG. 4, for reading the aforesaid identification data (and sensor data, if tags 3 are sensor-equipped). The reader shown in FIG. 4 an FIG. 5 comprises:
   i) a reader communication antenna 9a configured to permit effective communication with each RFID tag 3 (attached to its corresponding pipe 1) at the aforesaid low radio frequency not exceeding 1.0 megahertz;
   ii) a reader transceiver 10 in operative communication with the reader antenna 9a, the reader transceiver 10 being operable to transmit and receive data signals at the aforesaid low radio frequency not exceeding 1.0 megahertz;
   iii) a reader data storage device 11 operable to store data;
   iv) a reader data processor 12 in operative communication with reader transceiver 10 and reader data storage device 11; and
   v) a reader energy source 13 (e.g. a battery or A.C. power supply) for activating reader transceiver 10 and reader data processor 12.

Although various arrangements can be effective for good data communications between tag 3 and reader 9, as shown in FIG. 5, reader communication antenna 9a is positioned and configured to encircle a lateral cross-section of pipe 1 during movement thereof past reader communication antenna 9a when pipe 1 is inserted into a hole 14 that is drilled into the earth (whether in dry ground or in an undersea floor).

According to a first embodiment of FIG. 3a, the tag energy source 8 comprises an energy storage device, such as a battery.

According to a second embodiment of FIG. 3b, the tag antenna is a tag communication antenna 5 which preferably comprises a first elongated ferrite core for enhanced data communications. In this embodiment, the aforesaid tag energy source 8 comprises a) a tag power antenna 8b (preferably comprising a second elongated ferrite core, oriented substantially orthogonally to the first elongated ferrite core) operable to pick up electric energy induced by an applied varying electric field, and b) an energy storage device 8a (such as a capacitor or chargeable battery) connected to receive charging energy from the tag power antenna 8b. Preferably, the tag communication antenna 5 is tuned to maximize signal strength at a frequency f(com) that is distinct from (e.g. is an integer multiple of) the frequency f(power) to which the tag power antenna 8b is tuned. Neither f(com) nor f(power) exceed 1.0 megahertz. For example, when f(power)=64 hertz, then f(com) could be 128 hertz. According to this embodiment, reader 9 further comprises a reader power antenna 9b and a low frequency power generator 13a (both shown in dotted outline in FIG. 4) which is operable to generate the aforesaid applied varying electric field at a frequency close to f(power).

While the present invention has been described with reference to preferred embodiments thereof, numerous obvious changes and variations may readily be made by persons skilled in the fields of RFID tagging and drilling systems for gas and oil. Accordingly, the invention should be understood to include all such variations to the full extent embraced by the appended claims.

The invention claimed is:

1. A trackable pipe comprising:
   a) a hollow pipe comprising a wall portion having an outer surface;
   b) a low frequency radio frequency identification (RFID) tag attached to said hollow pipe at said outer surface, said RFID tag being operable at a low radio frequency not exceeding 1.0 megahertz, said RFID tag comprising:
      i) a tag transceiver operable to transmit and receive data signals at said low radio frequency not exceeding 1.0 megahertz;
      ii) a tag communication antenna operatively connected to the tag transceiver;
      iii) a tag data storage device operable to store data comprising identification data for identifying said object;
      iv) a tag data processor operable to process data received from said tag transceiver and said tag data storage device and to send data to cause said tag transceiver to emit an identification signal based upon said identification data stored in said tag data storage device; and
      v) a tag energy source for activating said tag transceiver and said tag data processor,
   wherein said tag energy source comprises an electrical energy storage device and an electrical generator operable to energize the aforesaid electrical storage device, and said electrical generator comprises a tag power antenna operable to pick up energy induced by an applied varying external electric field, and
   wherein said tag communication antenna comprises a first elongated ferrite core, said tag power antenna comprising a second elongated ferrite core, oriented substantially orthogonally to said first elongated ferrite core and energy storage device is connected to said tag power antenna.

2. The trackable pipe as set forth in claim 1, said wall portion comprising a recess that opens into said outer surface, said RFID tag being disposed within said recess of each hollow pipe.

3. The trackable pipe as set forth in claim 2, said recess being filled with a protective material that surrounds the RFID tag.

4. The trackable pipe as set forth in claim 3, said protective material comprising solidified epoxy.

5. The trackable pipe as set forth in claim 1, said trackable pipe comprising a container, said RFID tag being disposed within said container and said container being filled with a protective potting material, said container being disposed within said recess.

6. The trackable pipe as set forth in claim 1, wherein said RFID tag comprises a sensor operable to measure an environmental condition selected from temperature and pressure, said RFID tag further comprising a clocking device operable to identify times of data transmissions and of measurements of said environmental conditions.

7. The trackable pipe as set forth in claim 1, wherein said tag energy source comprises an energy storage device.

8. The trackable pipe as set forth in claim 7, wherein said energy storage device is a battery.

9. The trackable pipe as set forth in claim 1, wherein said electrical energy storage device comprises a battery.

10. The trackable pipe as set forth in claim 1, wherein said tag communication antenna is tuned to frequency f(com) that is distinct from the frequency f(power) to which tag power antenna is tuned, neither f(com) nor f(power) exceeding 1.0 megahertz.

11. The trackable pipe as set forth in claim 10, wherein f(com) equals an integer multiple of f(power).

12. A system for tracking pipes, said system comprising:
   a) a plurality of pipes, each pipe being hollow, axially elongated and comprising a wall portion which comprises an outer surface;
   b) a low frequency radio frequency identification (RFID) tag attached to said hollow pipe at the aforesaid outer surface, said RFID tag being operable at a low radio frequency not exceeding 1.0 megahertz, said RFID tag being disposed within the aforesaid recess of each hollow pipe, said RFID tag comprising:
      i) a tag transceiver operable to transmit and receive data signals at said low radio frequency not exceeding 1.0 megahertz;
      ii) a tag communication antenna operatively connected to said tag transceiver, said tag communication antenna comprising a first elongated ferrite core with a plurality of windings thereon;
      iii) a tag data storage device operable to store data comprising identification data for identifying said object;
      iv) a tag data processor operable to process data received from said tag transceiver and said data storage device and to send data to cause said transceiver to emit an identification signal based upon said identification data stored in said data storage device; and
      v) a tag energy source for activating said tag transceiver and said tag data processor, said tag energy source comprising an electrical energy storage device and an electrical generator operable to energize the aforesaid electrical storage device, said electrical generator comprising a tag power antenna operable to pick up energy induced by an applied varying external electric field, said tag power antenna comprising a second elongated ferrite core oriented substantially orthogonally to said first elongated ferrite core, said energy storage device being connected to said tag power antenna;
   c) a reader for reading said identification data, said reader comprising:
      i) a reader communication antenna configured to permit effective communication with each said RFID tag at said low radio frequency not exceeding 1.0 megahertz;
      ii) a reader transceiver in operative communication with said reader communication antenna, said reader transceiver being operable to transmit and receive data signals at said low radio frequency not exceeding 1.0 megahertz;
      iii) a reader data storage device operable to store data;
      iv) a reader data processor in operative communication with said reader transceiver and said reader data storage device; and
      v) a reader energy source selected from a battery and an A.C. power supply, said reader energy source being operable to activate said reader transceiver and said reader data processor.

13. The system as set forth in claim 12, wherein said wall portion comprises a recess that opens into the aforesaid outer surface, the aforesaid RFID tag being disposed within the aforesaid recess of each hollow pipe.

14. The system as set forth in claim 12, said reader comprising a reader power antenna and a low frequency power generator operable to generate said applied varying external electric field at a frequency that is distinct from said low radio frequency not exceeding 1.0 megahertz.

15. The system as set forth in claim 14, said reader communication antenna and said reader power antenna being positioned and configured to encircle a lateral cross-section of said pipe during movement thereof past said reader communication antenna and said reader power antenna.

* * * * *